Nov. 7, 1961    M. MAHARICK    3,007,715
STABILIZER COUPLING FOR AIR CUSHION SUSPENSION
Filed Aug. 18, 1960    2 Sheets-Sheet 1

INVENTOR.
MATT MAHARICK
BY
WATTS, EDGERTON, PYLE & FISHER
ATTORNEYS

Nov. 7, 1961   M. MAHARICK   3,007,715
STABILIZER COUPLING FOR AIR CUSHION SUSPENSION
Filed Aug. 18, 1960   2 Sheets-Sheet 2

INVENTOR.
MATT MAHARICK
BY
WATTS, EDGERTON, PYLE, & FISHER
B.D. Watts
ATTORNEYS 3,007,715
Patented Nov. 7, 1961

1

3,007,715
STABILIZER COUPLING FOR AIR
CUSHION SUSPENSION
Matt Maharick, Niles, Ohio, assignor to Youngstown
Steel Car Corporation, Niles, Ohio, a corporation of
Ohio
Filed Aug. 18, 1960, Ser. No. 50,378
7 Claims. (Cl. 280—124)

This invention relates broadly to pneumatic spring suspension assemblies and more specifically to improvements in the invention disclosed in Patent No. 2,865,652, dated December 23, 1958.

One of the objects of the invention is to provide an air cell supporting structure embodying a pair of bolsters mounted for pivotal movement in a vertical plane and a truss therefor to maintain the bolsters in a common horizontal plane.

Another object of the invention is to provide a yieldable connection between the bolsters and the truss to afford universal movement but restrain excessive side sway of the bolsters.

Further objects of the invention reside in the production of an undercarriage of low unsprung weight, a structure which will resist axial movement of the bolsters upon application of the brakes and a structure which is economic of manufacture, efficient of operation and durable of structure.

The invention further comprehends stabilizer characterestics which may be readily adjustable by changing the size, shape or material and adjusting the tension on the air cushions.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
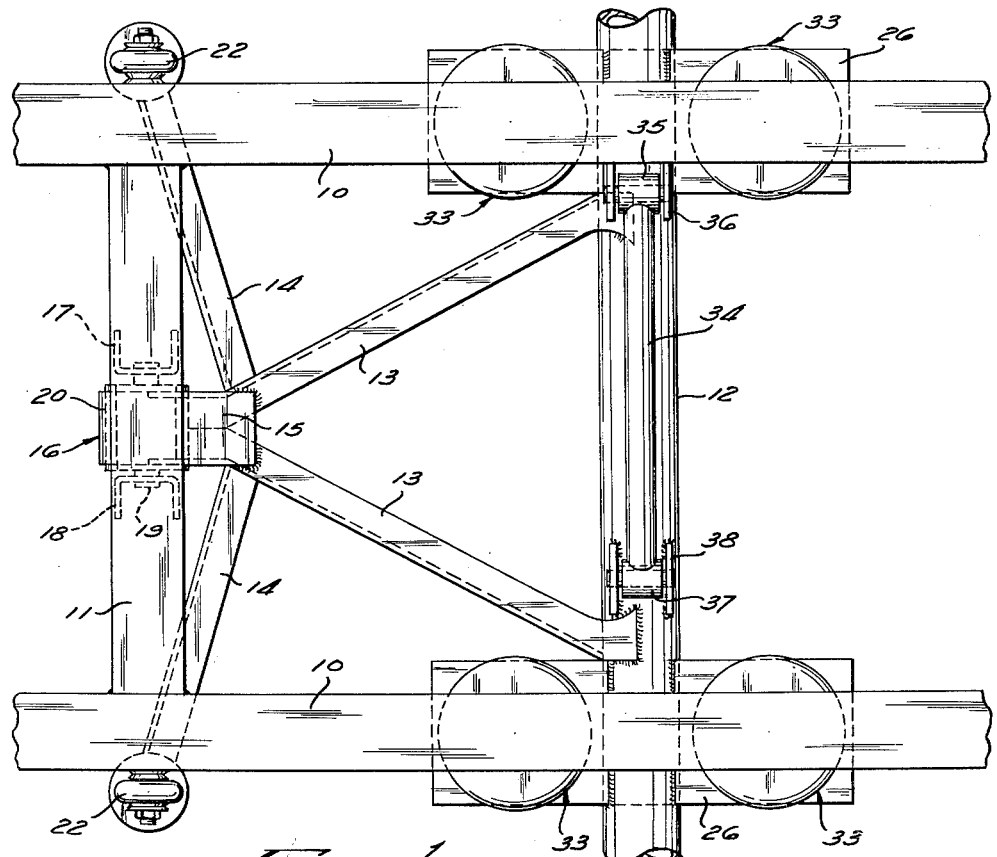
FIG. 1 is a plan view of a portion of the undercarriage embodying the invention.
Figure 2:
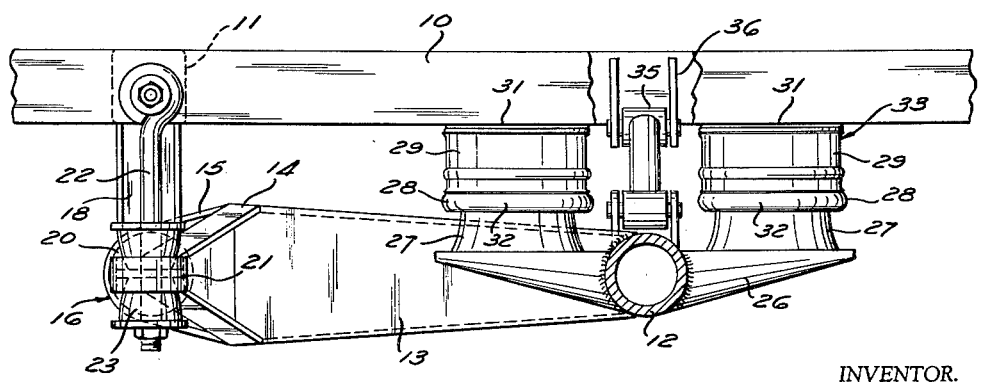
FIG. 2 is a side elevational view thereof, portions of the drawing being shown in section and broken away in the interest of clarity.

Referring first to FIGS. 1 and 2, the vehicular undercarriage comprises a pair of parallel spaced side rails 10 united by a frame cross member 11 and having a tubular axle 12 disposed in spaced parallel relation rearward therewith. FIGURES 1 and 2 illustrate only a portion of the undercarriage, and hence but one axle 12 and one cross member 11 are shown. There may be several of each if so required, but the invention is illustrated with but one of each. The axle is connected to the cross member 11 by a pair of convergent channels 13 welded to a pair of divergent channels 14 and to a bearing block 15 comprising a housing 16 supported by a pair of depending channels 17 and 18 pierced at their lower ends for the support of a rubber clad pin 19 retained in a cylindrical sleeve 20 affixed to the housing 16. The channels 14 are welded at their outer ends to circular discs 21 disposed in vertical alignment with the cross member 11 and apertured to receive eye bolts 22 for the retention of a pair of opposed rubber buffer blocks 23 preferably of frustro conical form affixed on the bolts by washers 24. The eyes of the bolts 22 are pivot-

Figure 5:
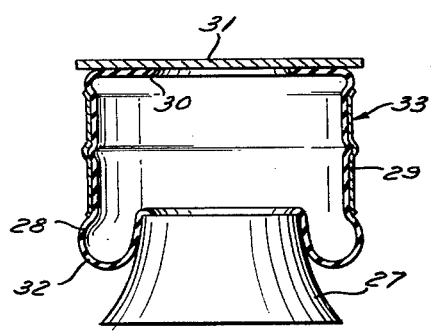
FIG. 5 is a vertical sectional view of the air cushion embodied in the present invention.

2 ally mounted in rubber clad bearings on pintals 25 on the outer faces of the side rails 10. The channels 13 are welded to the axle 12 adjacent the outer ends thereof and each end of the axle has a bolster block 26 welded thereto subjacent the frame side rails 10. Each bolster block supports a pair of frustro conical posts 27 (FIG. 5) secured to the upper face of the bolsters, and a rubber sleeve 28 is affixed to the upper edge thereof. A metallic tubular cylinder 29 surrounds the major portion of the sleeve and the closed end 30 thereof protrudes through the sleeve and is vulcanized to a plate 31 anchored on the lower face of the side rails 11. The diameter of the top of the posts 27 is less than the diameter of the rubber sleeve 28 and a cuff or enlarged portion 32 overhangs the post and protrudes beyond the base of the tubular cylinder 29. The function of the air cells 33 constituting the posts 27 and rubber sleeves 28 is to provide a spring cushion for vertical movement of the axle and to afford limited lateral movement of the assemblies to accommodate side sway thereof when the vehicle negotiates a sharp bend in the road consequent centrifugal strains.

Excessive lateral movement of the frame relative to the axle is arrested by a tracking bar 34 pivotally mounted on a rubber clad pin 35 supported in a channel 36 affixed upon one side of the vehicle side rails 10 and pivotally mounted in a rubber clad pin 37 supported in a channel 38 welded to the upper face of the axle 12.

When the vehicle is running over a highway the rubber air cells 33 will absorb the road shocks and produce a smooth even ride. When the vehicle negotiates a bend in the road the air cushions will sway laterally and permit the vehicle wheels to respond, to a limited degree, to the centrifugal effort initiated by the bend in the road. The tracking bar 34, however, snubs excessive side sway and lateral movement. The divergent truss members 13 and 14, as well as the rubber bearing 16 in the cylindrical sleeve 20, stabilize the axle and the buffer blocks 23, and dampen the action of the air cushions 33 without shock or undue lateral movement.

Figure 3:
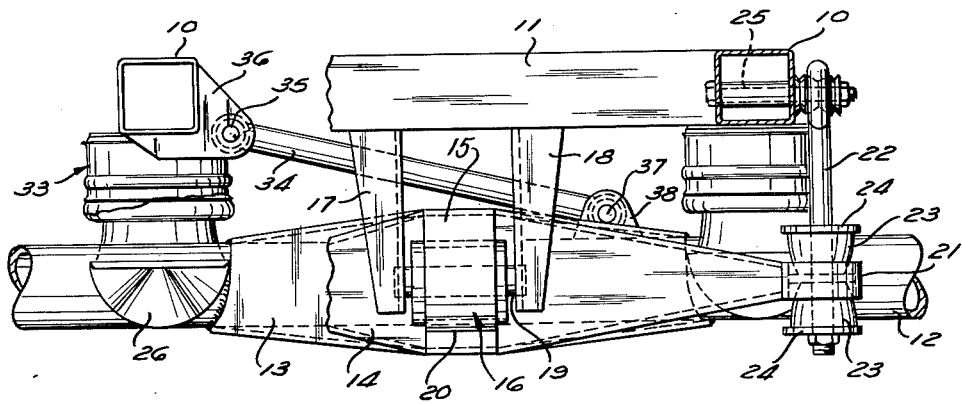
FIG. 3 is a front elevational view of the undercarriage with portions of the vehicular frame broken away.
Figure 4:
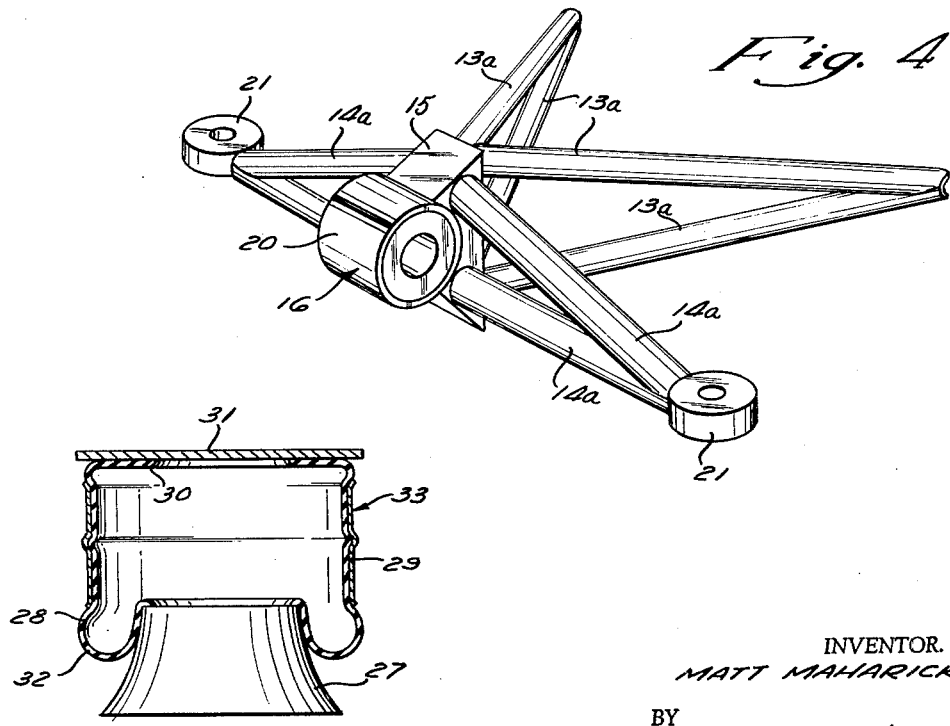
FIG. 4 is a view in perspective of a modified form of the truss.

In the embodiment illustrated in FIG. 4, the channels 13 and 14 of FIGS. 1 to 3 have been replaced by members 13a and 14a which are formed of tubular stock, the ends thereof that are connected to the axle hanger and disc being suitably scarfed to accommodate the welded affixation thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An air cell supporting structure for a road vehicle, comprising an axle, bolsters affixed thereto adjacent the ends thereof, air cells on said bolsters secured to the vehicular frame side rails, a frame cross member uniting said vehicular side rails, arms depending therefrom, a pin in the free ends of said arms, a cylindrical sleeve operably connected to said pin, a resilient liner therein, a block affixed to said sleeve, divergent arms secured to said block and said axle, a second pair of divergent arms secured to said block, bearing rings in the ends thereof subjacent said frame side rails, bolts depending from said frame side rails and resilient buffer blocks affixed on said bolts to delimit vertical movement of said frame side rails relative to said axle.

2. An air cell supporting structure for a road vehicle, comprising an axle, bolsters affixed thereto, air cells affixed to said bolsters and engaged with the vehicular frame side rails, a frame cross member uniting said vehicular side rails, arms depending therefrom, a pin in the free ends of said arms, a sleeve operably connected to said pin, a rubber bushing therein supported by said pin, a block affixed to said sleeve, divergent arms secured to said block and said axle, a second pair of divergent arms secured to said block, bearing rings in the ends thereof subjacent said frame side rails, bolts depending from said frame side rails and opposed conical rubber buffer blocks affixed on said bolts and sealed in said bearing rings to delimit vertical movement of said frame side rails relative to said axle.

3. An undercarriage for a road vehicle, comprising an axle, bolsters affixed thereon, air cells on said bolsters engaged with the vehicular frame side rails, a cross frame uniting said vehicular side rails, arms depending therefrom, a pin in the free ends of said arms, a steel sleeve operably connected to said pin, a rubber bushing supported by said pin, a block affixed to said steel sleeve, a pair of rearwardly divergent arms secured to said block and to said axle, a second pair of forwardly divergent arms secured to said block, bearing rings in the ends thereof subjacent said frame side rails, bolts depending from said frame side rails and opposed rubber cones in said bearing rings affixed on said bolts to delimit vertical movement of said frame side rails relative to said axle.

4. An undercarriage for a road vehicle comprising parallel vehicular frame side rails, at least one cross member uniting the ends thereof, arms depending from said cross member, a horizontal pin carried by the arms of said cross member, a rubber bushing supported by said pin, a steel sleeve encasing said bushing, a block affixed to said sleeve, lateral arms protruding from said block, rings in the ends of said arms subjacent said side rails, bolts affixed to and depending from said side rails, opposed rubber cones on said bolts sealed in said rings, second divergent arms affixed to said block, an axle affixed to the ends of said second arms, bolsters on said axle, air cells on said bolsters engaged with said side rails, a horizontal tracking bar pivotally connected to said axle and one of said side rails and rubber bushings in the pivotal connections for said tracking bar.

5. An undercarriage for a road vehicle comprising parallel vehicular frame side rails, at least one cross member uniting said rails, a pair of parallel arms depending from said cross member, a horizontal pin carried by the arms of said cross member, a rubber bushing on said pin, a steel sleeve encasing said bushing, a block affixed to said sleeve, arms affixed to and protruding laterally from said block, rings in the ends of said arm subjacent said side rails, bolts affixed to and depending from said side rails, opposed rubber cones on said bolts and sealed in said rings, a second pair of rearwardly partially divergent arms affixed to said block, a vehicular axle affixed to the rearward ends of said second arms, bolsters affixed to said axle, air cells on said bolster having the upper ends thereof engaged with said side rails, a tracking bar pivotally connected to said axle and one of said side rails and rubber bushings in the pivotal connections for said tracking bar.

6. An undercarriage for a road vehicle comprising a pair of parallel vehicular frame side rails, at least one cross member uniting said side rails, parallel arms depending from the central portion of said cross member, a pin in the free ends of said arms, a rubber bushing on said pin, a steel sleeve encasing said rubber bushing, a block affixed to said sleeve, lateral arms affixed to and protruding from said block, rings in the ends thereof subjacent said side rails, bolts affixed to and depending from said side rails, opposed rubber cones sealed in said rings and secured on said bolts, second rearwardly protruding divergent arms affixed to said block, an axle affixed to the ends of said second arms, bolsters affixed to said axle, air cells mounted on said bolsters and engaged with the lower face of said side rails, a tracking bar pivotally connected to one side of said axle and the opposed side frame, and rubber bushings in the pivotal connections for said tracking bar.

7. An undercarriage for the support of air cells that carry a pair of parallel vehicular frame side rails, a cross member uniting said side rails, a pair of spaced arms depending from a central part of said cross member, a horizontal pin in the free ends of said arms, a rubber bushing supported by said pin, a sleeve encasing said bushing, a block affixed to said sleeve, lateral arms affixed to and protruding from said block, rings in the ends thereof subjacent said side rails, bolts mounted in and depending from said side rails, rubber cones sealed in said rings and affixed on said bolts, a second pair of divergent arms affixed to and protruding rearwardly from said block, an axle affixed to the ends of said second arms, bolsters affixed to said axle, air cells affixed to said bolsters and engaged with said side rails, a tracking bar pivotally connected to said axle and to one of said side frames and rubber bushings in the pivotal connections for said tracking bar.

References Cited in the file of this patent

UNITED STATES PATENTS 2,865,649    Chalmers _____ Dec. 23, 1958
2,865,650    Chalmers _____ Dec. 23, 1958